(12) United States Patent
Wang et al.

(10) Patent No.: US 11,848,029 B2
(45) Date of Patent: Dec. 19, 2023

(54) METHOD AND DEVICE FOR DETECTING AUDIO SIGNAL, AND STORAGE MEDIUM

(71) Applicant: BEIJING XIAOMI PINECONE ELECTRONICS CO., LTD., Beijing (CN)

(72) Inventors: Yifeng Wang, Beijing (CN); Guodu Cai, Beijing (CN); Shuo Yang, Beijing (CN); Lihan Li, Beijing (CN); Peng Gao, Beijing (CN)

(73) Assignee: BEIJING XIAOMI PINECONE ELECTRONICS CO., LTD., Beijing (CN)

( * ) Notice: Subject to any disclaimer, the term of this patent is extended or adjusted under 35 U.S.C. 154(b) by 5 days.

(21) Appl. No.: 17/327,224

(22) Filed: May 21, 2021

(65) Prior Publication Data

US 2022/0165297 A1  May 26, 2022

(30) Foreign Application Priority Data

Nov. 20, 2020 (CN) .......................... 202011312515.7

(51) Int. Cl.
*G10L 25/87* (2013.01)
*G10L 15/02* (2006.01)
(Continued)

(52) U.S. Cl.
CPC ............. *G10L 25/87* (2013.01); *G10L 15/02* (2013.01); *G10L 15/04* (2013.01); *G10L 15/063* (2013.01); *G10L 15/142* (2013.01); *G10L 15/22* (2013.01); *G10L 25/18* (2013.01); *G10L 25/21* (2013.01); *G10L 25/24* (2013.01); *G10L 25/93* (2013.01); *G10L 2015/025* (2013.01)

(58) Field of Classification Search
None
See application file for complete search history.

(56) References Cited

U.S. PATENT DOCUMENTS 10,629,184 B2 * 4/2020 Bocklet ................. G10L 19/008
11,449,746 B2 * 9/2022 Baldwin ................. G06N 20/20
(Continued)

FOREIGN PATENT DOCUMENTS

GB         2567503 A  *  4/2019 ............. G10L 17/00

OTHER PUBLICATIONS

"Ali O. Abid Noor, Development of a Voice Activity Controlled Noise Canceller. 2012, Sensors Basel, All pages" (Year: 2012).*
(Continued)

*Primary Examiner* — Andrew C Flanders
*Assistant Examiner* — Jonathan Ernesto Amaya Hernandez
(74) *Attorney, Agent, or Firm* — COZEN O'CONNOR

(57) ABSTRACT

A method for detecting an audio signal, the method comprises: obtaining a speech segment and a non-speech segment of an audio signal to be detected, extracting a first audio feature of the speech segment and a second audio feature of the non-speech segment, detecting the first audio feature using a predetermined speech segment detection model to obtain a first detection score, detecting the second audio feature using a predetermined non-speech segment detection model to obtain a second detection score, and determining whether the audio signal belongs to a target audio based on the first detection score and the second detection score.

18 Claims, 5 Drawing Sheets

(51) Int. Cl.
  *G10L 15/04*    (2013.01)
  *G10L 15/06*    (2013.01)
  *G10L 15/14*    (2006.01)
  *G10L 15/22*    (2006.01)
  *G10L 25/18*    (2013.01)
  *G10L 25/21*    (2013.01)
  *G10L 25/24*    (2013.01)
  *G10L 25/93*    (2013.01)

(56) References Cited

U.S. PATENT DOCUMENTS

| | | | | |
|---|---|---|---|---|
| 2010/0057453 | A1* | 3/2010 | Valsan | G10L 25/78 704/231 |
| 2015/0178487 | A1* | 6/2015 | Hu | G06V 40/40 726/19 |
| 2017/0208359 | A1* | 7/2017 | Panger | H04N 21/4394 |
| 2019/0304472 | A1* | 10/2019 | Pendyala | G10L 17/24 |
| 2022/0157334 | A1* | 5/2022 | Alonso | G10L 17/26 |

OTHER PUBLICATIONS

"Xiaofei Li, Voice Activity Detection Based on Statistical Likelihood Ratio with Adaptive Thresholding, IEEE International Workshop on Acoustic Signal Enhancement, pp. 1-5" (Year: 2016).*

X. Li, R. Horaud, L. Girin and S. Gannot, "Voice activity detection based on statistical likelihood ratio with adaptive thresholding," 2016 IEEE International Workshop on Acoustic Signal Enhancement (IWAENC), Xi'an, China, 2016, pp. 1-5, doi: 10.1109/IWAENC.2016.7602911. (Year: 2016).*

European Patent Application No. 21175933.7 extended Search and Opinion dated Nov. 15, 2021, 9 pages.

Suthokumar, G et al. "Independent Modelling of High and Low Energy Speech Frames for Spoofing Detection"; Interspeech 2017, Aug. 20, 2017, pp. 2606-2610.

Delgado, H. "ASVspoof 2017 Version 2.0:meta-data analysis and baseline enhancements"; The Speaker and Language Recognition Workshop (Odyssey 2018) Jan. 1, 2018, 8 pages.

Wang, Y,. et al. "An Experimental Study on Replay Attack Detection Using Spoofing Clues from both Voiced and Non-Voiced Segments"; 2021 5$^{th}$ Int'l Conference on Digital Signal Processing; Feb. 26, 2021; pp. 266-271.

* cited by examiner ated to detect the second audio feature using a predetermined non-speech segment detection model to obtain a second detection score. The determining module is configured to determine whether the audio signal belongs to a target audio based on the first detection score and the second detection score.

According to a third aspect of embodiments of the present disclosure, there is provided a device for detecting an audio signal, including a processor and a memory for storing executable instructions capable of running on the processor. When the processor is configured to execute the executable instructions, the executable instructions perform steps in the method described in any above embodiment.

According to a fourth aspect of embodiments of the present disclosure, there is provided a non-transitory computer readable storage medium having computer executable instructions stored therein, when the computer executable instructions are executed by a processor, the processor is caused to implement steps in the method described in any above embodiment.

The above summary and the following details of the present disclosure are explanatory and illustrative, which shall not be construed to limit the present disclosure.

BRIEF DESCRIPTION OF THE DRAWINGS

The drawings are incorporated in the specification and form a part of the specification, which illustrate embodiments conforming to the present disclosure. The drawings together with the specification are used to explain the principle of the present disclosure.

DETAILED DESCRIPTION

Figure 1:
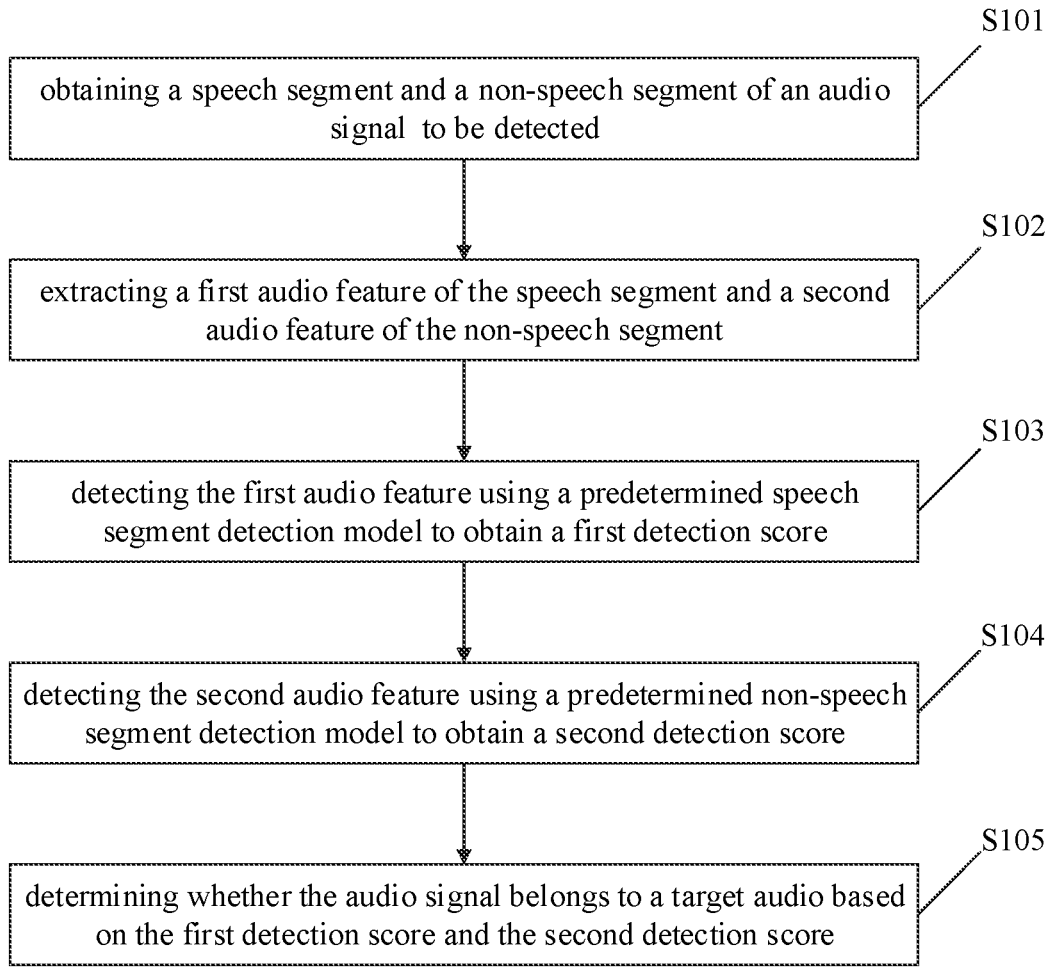
FIG. 1 is a first flowchart of a method for detecting an audio signal according to an embodiment of the present disclosure.

Embodiments of the present disclosure will be described in detail below with reference to the following drawings. Unless specified or limited otherwise, the same or similar elements and the elements having same or similar functions are denoted by like reference numerals throughout the descriptions. The implementations in the following embodiments do not represent all implementations conforming to the present disclosure. Instead, the implementations in the following embodiments are merely examples of the appa-

METHOD AND DEVICE FOR DETECTING AUDIO SIGNAL, AND STORAGE MEDIUM

CROSS-REFERENCE TO RELATED APPLICATIONS

This application claims the benefit of priority to Chinese Application No. 202011312515.7, filed on Nov. 20, 2020, the contents of which are incorporated herein by reference in their entirety.

TECHNICAL FIELD

The present disclosure relates to speech recognition technology, and more particularly, to a method for detecting an audio signal, an apparatus for detecting an audio signal and a storage medium.

BACKGROUND

With the widespread use of speech recognition technology, an audio detection method such as voiceprint recognition has become one of the effective implementations of identity authentication or speech control. For example, various door access systems, device identity authentication systems and user log-in verification systems and so on, as well as speech input and speech control of various smart terminals or programs may be implemented by the audio detection method. The audio detection is easy for the user and is suitable for a majority of people, such that it can be widely used. However, it is easy to simulate the voice by playback, such that safety and security of audio detection is poor.

SUMMARY

The present disclosure provides a method and an apparatus for detecting an audio signal and a storage medium. As used herein, an "audio signal" may refer to spoken audio through the air, audio carried over a transmission medium or any method or apparatus for representing audio content.

According to a first aspect of embodiments of the present disclosure, there is provided a method for detecting an audio signal. The method includes: obtaining a speech segment and a non-speech segment of an audio signal to be detected, extracting a first audio feature of the speech segment and a second audio feature of the non-speech segment, detecting the first audio feature using a predetermined speech segment detection model to obtain a first detection score, detecting the second audio feature using a predetermined non-speech segment detection model to obtain a second detection score, and determining whether the audio signal belongs to a target audio based on the first detection score and the second detection score.

According to a second aspect of embodiments of the present disclosure, there is provided an apparatus for detecting an audio signal. The apparatus includes a first obtaining module, an extracting module, a first detecting module, a second detecting module and a first determining module. The first obtaining module is configured to obtain a speech segment and a non-speech segment of an audio signal to be detected. The extracting module is configured to extract a first audio feature of the speech segment and a second audio feature of the non-speech segment. The first detecting module is configured to detect the first audio feature using a predetermined speech segment detection model to obtain a first detection score. The second detecting module is configur ratus and method described in the claims and in some aspect of the present disclosure. As used herein, an "audio signal" may refer to spoken audio through the air, audio carried over a transmission medium or any method or apparatus for representing audio content.

FIG. 1 is a flowchart of a method for detecting an audio signal according to an embodiment of the present disclosure. As illustrated in FIG. 1, the method may include the following:

At block S101, a speech segment and a non-speech segment in an audio signal to be detected are obtained.

At block S102, a first audio feature of the speech segment and a second audio feature of the non-speech segment are extracted.

At block S103, the first audio feature is detected using a predetermined speech segment detection model to obtain a first detection score.

At block S104, the second audio feature is detected using a predetermined non-speech segment detection module to obtain a second detection score.

At block S105, it is determined whether the audio signal belongs to a target audio based on the first detection score and the second detection score.

After an apparatus for detecting an audio signal collects the audio to be detected, the speech segment and the non-speech segment in the audio may be extracted through a voice activity detection. The speech segment is an audio segment containing human voice information in the audio to be detected, and the non-speech segment is an audio segment with various background sounds and noises, an audio segment with low volume, and so on.

In the embodiment of the present disclosure, for the speech segment and the non-speech segment, the first audio feature and the second audio feature are extracted, respectively. The first audio feature may be a distinguishing feature of a speech audio, for example, a frequency spectrum, an energy distribution and a change rule of the audio. Since the speech segment contains the human voice information while the non-speech segment merely contains the environmental sounds, noises, sounds made by an electronic device and so on, the audio feature of the speech segment is different from that of the non-speech segment.

In the embodiment of the present disclosure, for the speech segment and the non-speech segment, different detection models are used for feature detection. For the detection model, a training may be performed based on a predetermined speech audio and a predetermined non-speech audio, respectively, such that targeted models can be obtained. When performing audio detection, the speech segment and the non-speech segment are obtained based on the audio to be detected, and the audio features of the speech segment and the non-speech segment are inputted into respective detection models for detection.

In this way, the scores obtained from detection of the speech segment and the non-speech segment may be estimated from the 2-dimensional angle, and it may be determined whether the audio belongs to the target audio.

For example, when determining whether the audio belongs to the target audio, weighted averaging may be performed based on the first detection score and the second detection score to obtain a final score, and further it is determined whether the audio belongs to the target audio based on a predetermined score criterion.

The target audio refers to an audio signal inputted with real human voice, including a speech input audio of a target user, or an audio signal with a speech input content belonging to a predetermined content. If it is detected that the audio does not belong to the target audio, then the audio may be a record and replay audio or an audio signal generated by an electronic device. For example, during an identity authentication based on the audio detection, if the audio is detected to be the target audio, the authentication passes. If it is detected that the audio does not belong to the target audio, the authentication fails.

With the above method, different features of the speech segment and the non-speech segment in the audio may be effectively utilized and scored through respective models, such that more accurate detection result may be obtained, the accuracy and robustness of the audio detection may be effectively improved, while a possibility of replay attack may be reduced, thus improving a safety performance of an application scenario of the audio detection.

In some embodiments, obtaining the speech segment and the non-speech segment of the audio to be detected includes recognizing a first silent segment in the audio using a first recognition way, recognizing an unvoiced sound segment and a second silent segment in the audio using a second recognition way, determining a union of the unvoiced sound segment, the first silent segment and the second silent segment as the non-speech segment, and determining an audio segment other than the non-speech segment in the audio as the speech segment.

In the embodiment of the present disclosure, in consideration of the circumstance that the non-speech segment may contain an unvoiced sound part and a silent part, the unvoiced sound part and the silent part may be detected respectively. The silent part belongs to a part with low audio energy on respective frequency bands, such as a segment with a speech pause in the audio to be detected. The first silent segment may be recognized from the audio to be detected through the first recognition way, such as energy detection or volume detection.

Further, under consideration that many speeches have unvoiced phonemes, unvoiced sound may be generated when vocal cords do not vibrate but airstream flows to say a word. The unvoiced phoneme is similar to noise, and it is difficult to detect speech information from the unvoiced phoneme. Since the unvoiced phoneme is difficult to recognize through the volume detection or the energy detection, in the embodiment of the present disclosure, other methods may be used to recognize the phonemes, for example, the phoneme alignment may be performed on audio data to obtain aligned frames with clear phoneme labels, and further the unvoiced sound segment and the second silent segment may be obtained.

After the unvoiced sound segment, the first silent segment and the second silent segment are recognized through the above methods, the non-speech segment can be extracted from the audio to be detected, and the remaining audio segment is the speech segment.

In some embodiments, recognizing the first silent segment in the audio using the first recognition way includes performing an energy detection on the audio with a voice activity detection (VAD), and determining an audio segment having energy less than a predetermined threshold in the audio as the first silent segment.

VAD based on energy may be used to detect voice activity. The VAD may include VAD based on energy, VAD based on frequency domain, VAD based on energy cepstrum, VAD based on harmonic and so on. In the embodiment of the present disclosure, the VAD based on energy may be used to detect the voice activity. For example, an energy threshold may be determined in advance based on common speech energy of the audio to be detected in an application scenario. If the energy of the audio to be detected is less than the energy threshold, it is considered that there is no voice activity, and then the first silent segment is obtained.

The VAD based on energy is easy to implement without any complicated algorithm, such that the obvious silent segment in the audio to be detected may be screened out quickly.

In some embodiments, recognizing the unvoiced sound segment and the second silent segment in the audio using the second recognition way includes generating a phoneme set of the audio through a hidden markov model (HMM), performing a phoneme alignment on the phoneme set with a montreal forced aligner (MFA), and obtaining the unvoiced sound segment and the second silent segment in the phoneme set after the phoneme alignment.

In the embodiment of the present disclosure, the above second recognition way is a recognition method accurate to phonemes. The phoneme set is generated through the HMM, and the phoneme alignment is performed on the phoneme set to obtain clear aligned frames. In this way, the unvoiced sound segment which is difficult to recognize through the energy detection and scattered silent segments among the speech can be recognized.

In some embodiments, the predetermined speech segment detection model includes a first real sound model and a first attack sound model. Detecting the first audio feature using the predetermined speech segment detection model to obtain the first detection score includes detecting the first audio feature using the first real sound model to obtain a first real sound score, detecting the first audio feature using the first attack sound model to obtain a first attack sound score, and determining the first detection score based on the first real sound score and the first attack sound score.

In the embodiment of the present disclosure, the first real sound model and the first attack sound model described above may be two independent models. When the detection is performed, the first audio feature of the speech segment in the audio to be detected may be inputted into the two models respectively, to obtain the scores. The first real sound score reflects a possibility that the speech segment is an audio signal made of real human voice. The first attack sound score reflects a possibility that the speech segment is a record and replay audio or an audio signal generated by an electronic device. The speech segment detection model may determine the first detection score based on the above two scores.

The first detection score may be a score obtained by performing weighted averaging on the first real sound score and the first attack sound score, or may be a score set containing the above two scores.

In some embodiments, the predetermined non-speech segment detection model includes a second real sound model and a second attack sound model. Detecting the second audio feature using the predetermined non-speech segment detection model to obtain the second detection score includes detecting the second audio feature using the second real sound model to obtain a second real sound score, detecting the second audio feature using the second attack sound model to obtain a second attack sound score, and determining the second detection score based on the second real sound score and the second attack sound score.

Similar to the detection of the speech segment, the second audio feature of the non-speech segment in the audio to be detected may be inputted into the second real sound model and the second attack sound model described above respectively, to obtain two scores. The non-speech segment detection model may determine the second detection score based on the above two scores.

The first detection score and the second detection score may form a final score set, or weighted averaging may be performed based on the first detection score and the second detection score to obtain the final score of the audio to be detected. A determination criterion determined based on a precision requirement, an application scenario, historical data and so on may be used to determine whether the final score of the audio to be detected is a score of real sound or a score of attack sound.

In some embodiments, extracting the first audio feature of the speech segment and the second audio feature of the non-speech segment includes obtaining a number of collecting channels of the audio, extracting the first audio feature of the speech segment with a cepstral mean and variance normalization (CMVN) if the number of collecting channels satisfies a predetermined number condition, and extracting the second audio feature of the non-speech segment with the CMVN if the number of collecting channels satisfies the predetermined number condition.

In the embodiment of the present disclosure, under consideration that a function of the CMVN is to reduce the channel effect and additive noise interference, in a situation that an audio signal is collected through multiple channels, the CMVN can be performed to improve an accuracy of audio feature extraction and reduce feature extraction deviation caused by the interference. In the case of a single channel or small amount of channels, it is insufficient to generate the channel effect or other interferences, such that no CMVN is needed.

For example, if the audio to be detected is collected through at least two audio collecting channels, the first audio feature may be determined based on Constant-Q Cepstral Coefficients (CQCC) of the speech segment through the CMVN, and the second audio feature may be determined based on Inverted Mel Frequency Cepstral Coefficients (IMFCC) of the non-speech segment through the CMVN. If the audio to be detected is collected through a signal audio collecting channel, the first audio feature is determined based on the CQCC of the speech segment and the second audio feature is determined based on the IMFCC of the non-speech segment.

For example, the predetermined number condition may refer to that the number of collecting channels is greater than or equal to a predetermined threshold. If the number of collecting channels is less than the predetermined threshold, the predetermined number condition is not met. For example, if the number of collecting channels is greater than or equal to 2, the predetermined number condition is met, and if the number of collecting channels is equal to 1, the predetermined number condition is not met.

In some embodiments, extracting the first audio feature of the speech segment and the second audio feature of the non-speech segment includes determining an extraction frequency band of the first audio feature based on a relevancy between the audio and a predetermined speech content, extracting the first audio feature on the extraction frequency band from the speech segment and extracting the second audio feature from the non-speech segment.

The predetermined speech content substantially is text information pre-stored in a terminal or automatically generated by the terminal. If the audio to be detected is not a speech corresponding to the text information, i.e., the relevancy is less than a predetermined threshold, the CQCC of the speech segment on a predetermined first frequency band may be determined. Since the text information typically exists on a lower frequency band, the speech with no relation to the predetermined text information may be used to reduce influence of the text information as possible, such that the CQCC on a higher frequency band may be extracted, for example, the CQCC within a range of 6 KHz to 8 KHz may be extracted.

For the audio to be detected related to the text of the predetermined speech content, the text information may be retained, such that the CQCC on a second frequency band may be extracted. The second frequency band may be a specified frequency band which has a bandwidth larger than that of the first frequency band and contains first the frequency band, or may be an entire frequency band which may be detected by the terminal.

For the second audio feature of the non-speech segment, it is unnecessary to consider the influence of the text information, such that the second audio feature of the non-speech segment on the entire frequency band can be extracted directly.

Figure 2:
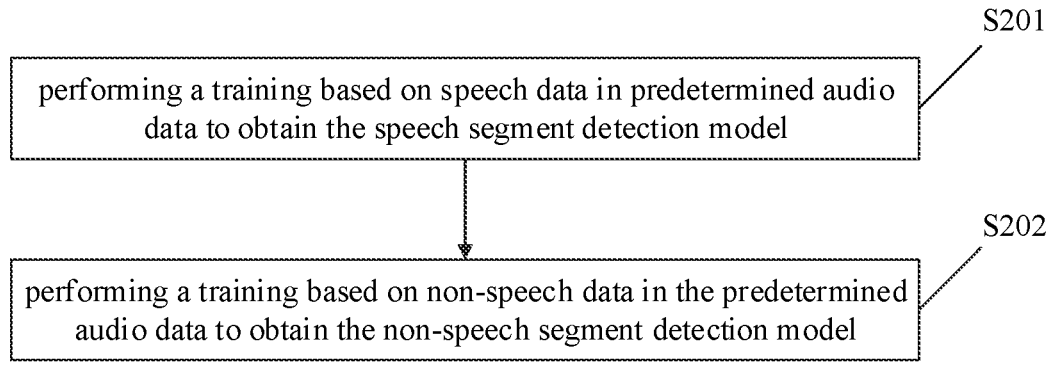
FIG. 2 is a second flowchart of a method for detecting an audio signal according to an embodiment of the present disclosure.

In some embodiments, as illustrated in FIG. 2, before determining whether the audio belongs to the target audio, the method further includes the following.

At block S201, a training is performed based on speech data in predetermined audio data to obtain the speech segment detection model.

At block S202, a training is performed based on non-speech data in the predetermined audio data to obtain the non-speech segment detection model.

In the embodiment of the present disclosure, the speech segment detection model and the non-speech detection model may be obtained by performing the training based on the predetermined audio data. During the training, the predetermined audio data may be classified into the speech data and the non-speech data, for example through the above VAD.

The predetermined audio data may be replay data, or may be real human voice. In other words, since the above detection models are obtained by performing the training based on classified audio data corresponding to respective detections, the detection models may conform to the audio characteristics of the audio to be detected, such that more accurate result may be obtained when the audio is detected.

In some embodiments, the predetermined audio data includes predetermined real sound data and predetermined attack sound data. The speech segment detection model includes a first real sound model and a first attack sound model. The non-speech segment detection model includes a second real sound model and a second attack sound model. Performing the training based on the speech data in the predetermined audio data to obtain the speech segment detection model includes performing the training based on the speech data in the predetermined real sound data to obtain the first real sound model, and performing the training based on the speech data in the predetermined attack sound data to obtain the first attack sound model. Performing the training based on the non-speech data in the predetermined audio data to obtain the non-speech segment detection model includes performing the training based on the non-speech data in the predetermined real sound data to obtain the second real sound model, and performing the training based on the non-speech data in the predetermined attack sound data to obtain the second attack sound model.

The audio data used during the training may include predetermined attack sound data such as replay data, and predetermined real sound data such as real human voice. The model conforming to the real human voice and the attack model may be obtained respectively by performing the training based on different data.

In the embodiment of the present disclosure, by performing the training on the speech segment data and the non-speech segment data based on the above different audio data, four different models may be obtained, i.e., the first real sound model, the first attack sound model, the second real sound model, and the second attack sound model.

During the model training, the speech segment and the non-speech segment may be obtained based on the predetermined real sound data and the predetermined attack sound data respectively, and the feature extraction is performed such that the model training is performed based on the extracted features, respectively.

For example, when performing the model training based on the predetermined real sound data, it may be determined based on the number of microphone channels for collecting the audio to perform the CMVN or to directly collect the audio features. For example, if the number of collecting channels is greater than or equal to 2, the CMVN is performed and the audio features (such as CQSS and IMFCC and so on) of the speech segment and the non-speech segment may be collected. The collected features may be configured as training data of the first real sound model or the second real sound model.

When performing the model training based on the predetermined attack sound data, the audio features (such as CQSS and IMFCC and so on) of the speech segment and the non-speech segment may be collected. The collected features may be configured as training data of the first attack sound model or the second attack sound model.

When performing the detection, the audio to be detected may be divided into the speech segment and the non-speech segment, and the audio feature of the speech segment is inputted into the first real sound model and the first attack sound model respectively to obtain a probability score indicating that the speech segment belongs to the real sound and a probability score indicating that the speech segment belongs to the attack sound. The audio feature of the non-speech segment is inputted into the second real sound model and the second attack sound model respectively to obtain a probability score indicating that the non-speech segment belongs to the real sound and a probability score indicating that the non-speech segment belongs to the attack sound.

After obtaining the above four scores, a possibility that the audio to be detected belongs to the real sound may be determined based on the four scores. Or the weighted averaging may be performed on the four scores using a predetermined weight to obtain a final score, and the possibility that the audio to be detected belongs to the real sound may be determined based on the final score.

The embodiment of the present disclosure further provides the following examples.

Similar to the face recognition, in-vivo detection is needed for the voiceprint recognition, so as to determine whether the sound is real human voice or fake sound. The voiceprint recognition system may be attacked by the following ways, a. waveform splicing attack, b. record and replay attack, c. speech synthesizing attack, d. speech transforming attack, e. speech simulating attack. The record attack is easy to implement without any professional knowledge or specific hardware and difficult to detect. The attacker merely needs to record a speech of a target speaker by using a phone and replay the speech to pose as the target speaker to pass the authentication of the voiceprint recognition system.

In the record attack, there may be unpredictable variation, which generally refers to real voice interweaving with each other due to record and replay and other unimportant variable sources, including a record and replay device, environmental noises, speech content, identity of the speaker and so on.

In an embodiment, when using the non-speech segment to detect the record and replay attack, all collected speeches are used directly without any voice activity detection, because the non-speech segment contains channel information of the record and replay device and even does not contain any speech, such that it is easy to detect, but the detection precision is low.

Figure 3:
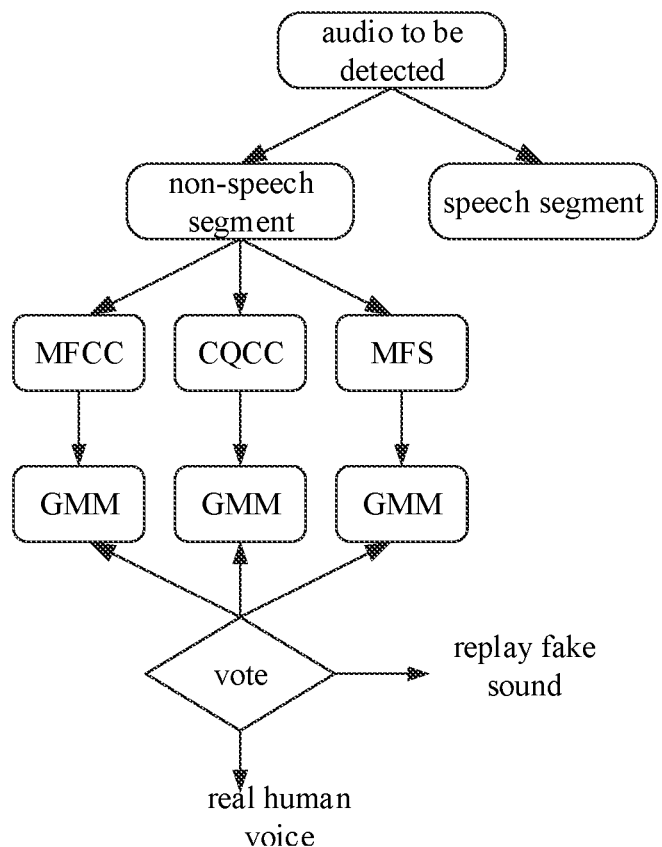
FIG. 3 is a third flowchart of a method for detecting an audio signal according to an embodiment of the present disclosure.

In another embodiment, as illustrated in FIG. 3, the non-speech segment including the silent segment and the unvoiced sound segment may be extracted from the audio through the VAD. For the non-speech segment, features such as the CQCC, Mel-Frequency Cepstral Coefficients (MFCC), Mel-Filterbank-Slope (MFS) may be extracted and classified using a Gaussian Mixture Model (GMM), and a voting is taken to provide a final classification result. For example, when merely the unvoiced sound segment and the silent segment in the non-speech audio are used to detect the record and replay attack, the resulting Equal Error Rate (EER) may be improved by 37% compared to using the entire audio to detect. However, it is possible that an audio signal to be detected contains unvoiced sound and silent segments with the duration less than 50% of the entire audio and such method performs poorly for the audio with short-time unvoiced sound and silent segments. The audio may merely contain the speech segment but does not contain the non-speech segment or merely contains a short non-speech segment, and then such method may be ineffective.

Figure 4:
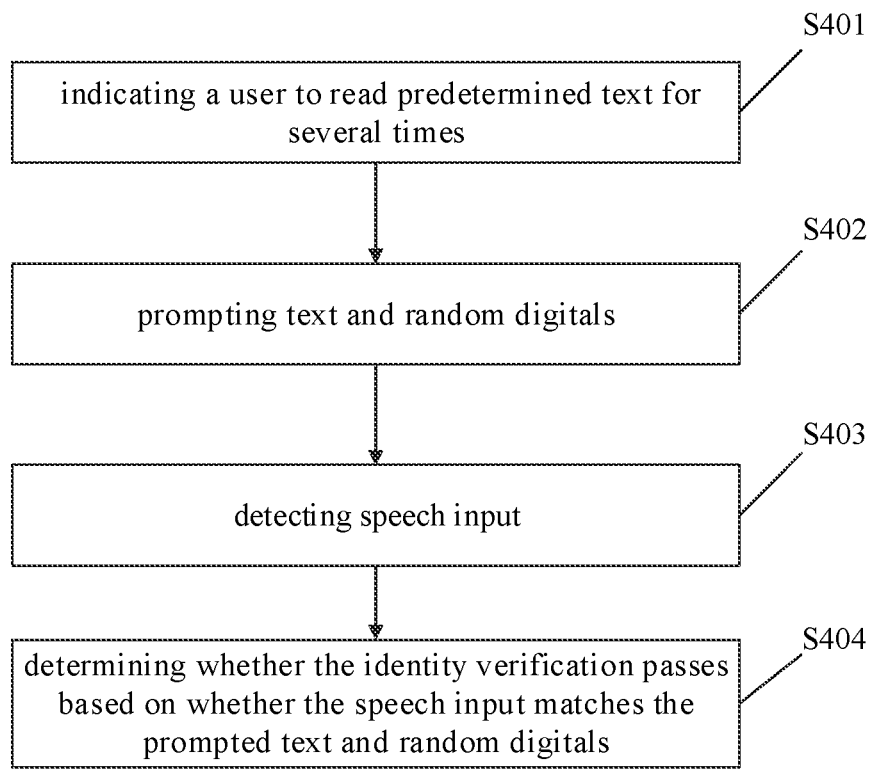
FIG. 4 is a fourth flowchart of a method for detecting an audio signal according to an embodiment of the present disclosure.

In an embodiment, text provided by the voiceprint recognition system may be random dynamic content, which may be used to prevent record attack. For example, the user is instructed to recite a predetermined slogan+ four random dynamic digitals. As illustrated in FIG. 4, the terminal indicates the user to read the predetermined text for specific times, such as for five times (see block S401 in FIG. 4). When the verification is performed, the terminal provides prompt text, for example, to prompt the user to read the predetermined text and random digitals (see block S402 in FIG. 4), and determines whether the identity verification of the user passes based on the speech information inputted by the user (see block S403-S404 in FIG. 4). However, in this way, the user is required to speak out the specific text and the text is refreshed per few seconds, which brings a memory burden.

However, the above method does not adopt technical means to prevent the replay attack, but updates the dynamic text and indicates the user to recite when performing the verification, i.e., complicated steps are required to verify the identity of voiceprint.

Therefore, the embodiment of the present disclosure provides a method which may be used in the text independent or text dependent voiceprint verification scenario. The acoustic features of the speech and non-speech are unitized to improve the robustness of the voiceprint recognition system.

The embodiment of the present disclosure provides a method of extracting different features with regard to different characteristics of the non-speech segment and the speech segment in the audio to be detected, classifying the features using classifiers and performing score calibration on the results of the classifiers, to improve the recognition result.

Figure 5A:
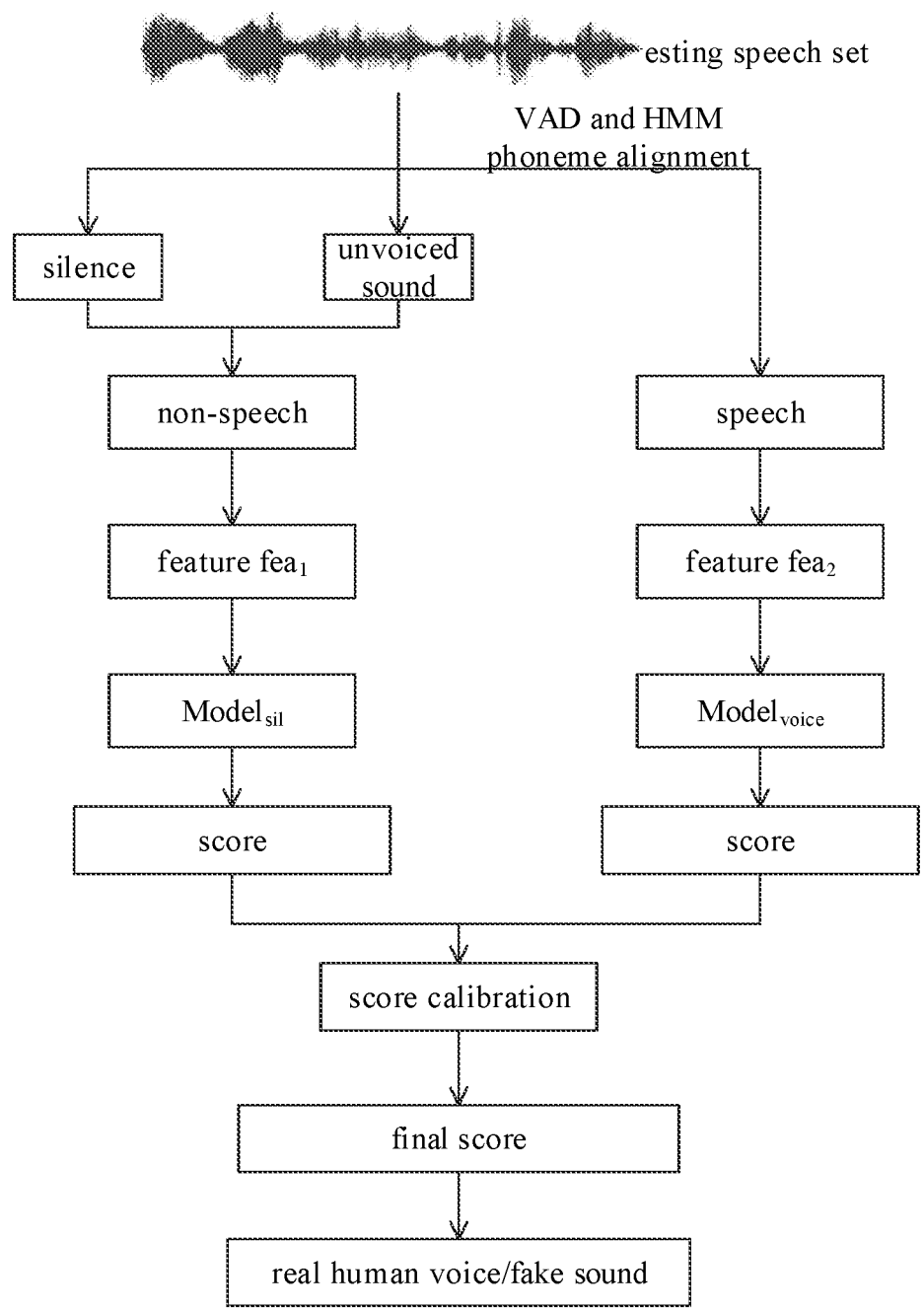
FIG. 5A is a fifth flowchart of a method for detecting an audio signal according to an embodiment of the present disclosure.

As illustrated in FIG. 5A, the embodiment of the present disclosure provides a method for detecting an audio signal, which includes the following.

1) Feature Processing a. VAD

A, the VAD is performed on obtained speech data to recognize a silent segment and a non-silent segment of a speech signal to be detected. In this embodiment, the VAD based on energy is used.

B, since an unvoiced sound segment and the silent segment with high energy cannot be recognized by the VAD, a phoneme alignment based on HMM is used to perform further detection. In detail, HMM acoustic model is obtained by training, and MFA is performed on all the data in a data set to obtain aligned frames with clear phoneme labels.

C, a union of the silent segment obtained by the VAD and the aligned silent and unvoiced sound detection result obtained by the HMM is taken as a final non-speech segment, and the remaining frames are considered as a speech segment.

b. feature extraction: an acoustic feature fea1 is extracted from the non-speech frame, and an acoustic feature fea2 is extracted from the speech frame.

If there is a text independent task (i.e., text content of a training speech is inconsistent with that of a testing speech), for the speech frame, only feature on the high frequency band is extracted. Since most text information exists on the low frequency band, influence of the text information can be effectively reduced by merely extracting the speech feature on the high frequency band. In the embodiment, for the speech frame, the CQCC high_cqcc on 6 KHz-8 KHz frequency band is extracted, i.e., fea2=high_cqcc.

If there is a text dependent task (i.e., the text content of the training speech is consistent with that of the testing speech), for the speech frame, the feature on the entire frequency band are extracted. In the embodiment, the CQCC (8000/$2^9$~8000 Hz) is configured as the speech feature on the entire frequency band, i.e., fea2=cqcc.

Regardless of whether there is a text independent task or a text dependent task, for the non-speech frame, the feature on the entire frequency band is extracted. Either the low frequency band or the high frequency band contains record and replay information, but the high frequency band contains more information, such that IMFCC is used in the embodiment, which may cover the entire frequency band from low to high and has high resolution on the high frequency band and low resolution on the low frequency band. That is, fea1=imfcc.

c. CMVN

The function of CMVN is to reduce the channel effect and additive noise interference. Theoretically, CMVN is bad for the task of detecting the replay attack.

However, for different data sets, CMVN has different performances. In the embodiment, there may be two situations.

First kind of data set, the data set of real speech is collected through n (n>=2) microphone channels, then CMVN is performed for the features.

Second kind of data set, the data set of real speech is collected through n (n=1) microphone channels, no CMVN is performed for the features.

The features used for different data sets and different tasks are shown in Table 1 as follows.

TABLE 1

| Task | Segment | First kind of data set: real speech is collected through n (n > 1) microphone channels | Second kind of data set: real speech is collected through n (n = 1) microphone channels |
|---|---|---|---|
| text dependent | speech segment | cqcc + cmvn | cqcc |
| | non-speech segment | imfcc + cmvn | imfcc |
| text independent | speech segment | high_cqcc + cmvn | high_cqcc |
| | non-speech segment | imfcc + cmvn | imfcc |

2) Model Training

Figure 5B:
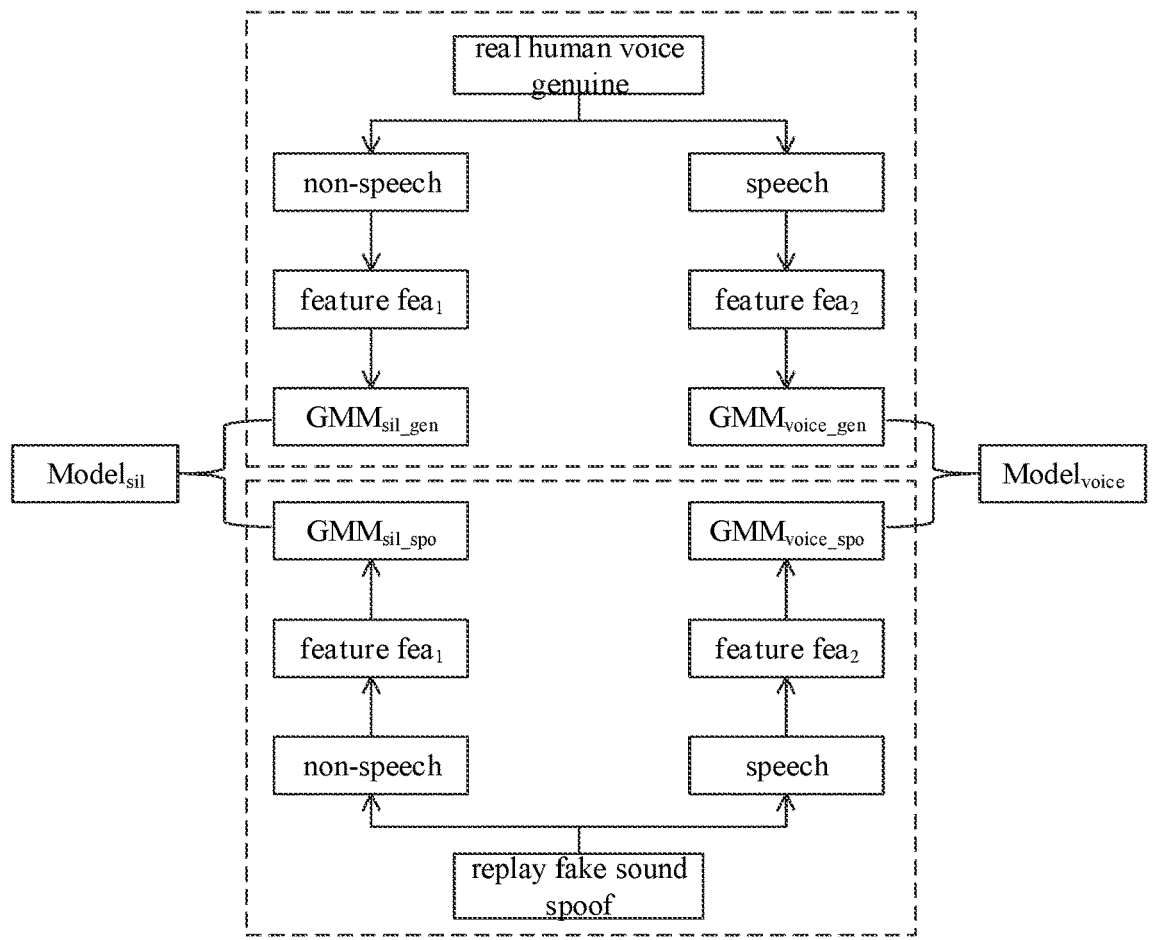
FIG. 5B is a flowchart of a process of training a model in a method for detecting an audio signal according to an embodiment of the present disclosure.

The features corresponding respectively to the above data sets are inputted into respective models, and training of models is shown in FIG. 5B. Non-speech frame model GMMsil_gen and speech frame model GMMvoice_gen of real speech may be obtained by performing the model training based on speech frames and non-speech frames of real speech in the training set. Similarly, non-speech frame model GMMsil_spo and speech frame model GMMvoice_spo of fake speech may be obtained by performing the model training based on speech frames and non-speech frames of replay speech in the training set.

3) Score Calibration a. for the testing speech set, Model_sil and Model_voice are used to score the non-speech frame and the speech frame to obtain score_sil and score_voice.

b. All scores of the speech segment and the non-speech segment obtained based on different models are processed. An open-source speaker score calibration is used to mix and calibrate the scores of the speech segment and the non-speech segment. Such method is mainly to optimize log-likelihood ratio score of the two models through linear transformation to improve the EER.

The above technical solution of the embodiment may support detection of record and replay attacks of the text independent voiceprint verification system and the text dependent independent voiceprint verification system.

Different features of the non-speech frame and the speech frame are extracted and the robustness of the voiceprint recognition is improved by the score calibration. The recognition effect is significantly improved compared to extract one feature for a complete sentence.

c. experimental result is shown below. The data of ASVspoof2017-V2 (Automatic Speaker Verification Spoofing and Countermeasures Challenge), i.e., the second kind of data set is used. Only the training set is used to train GMM, and the outcome indicator is EER. Table 2 shows EERs for different features in the case of performing GMM modeling for a whole-sentence speech. Table 3 shows EERs after the score calibration in the case of performing the GMM modeling for the non-speech segment and the speech segment respectively, in which the best result (EER=16.10%) is achieved for the validation set.

TABLE 2

EERs obtained by extracting the feature from the whole-sentence speech

| Speech segment + Feature | whole-sentence speech cqcc | whole-sentence speech imfcc | whole-sentence speech Cqcc + cmvn | whole-sentence speech Imfcc + cmvn | whole-sentence speech Cqcc (6k-8k) | whole-sentence speech Imfcc + cmvn |
|---|---|---|---|---|---|---|
| Development set | 11.40% | 5.36% | 13.64% | 12.31% | 9.45% | 6.56% |
| Validation set | 32.43% | 31.51% | 19.4% | 18.37% | 19.81% | 27.95% |

TABLE 3

EERs obtained by modeling for the non-speech segment and the speech segment respectively and mixing the scores

| Speech segment + Feature | Speech segment Cqcc + cmvn | Non-speech segment Imfcc + cmvn | score calibration |
|---|---|---|---|
| Development set | 11.13% | 11.84% | 10.29% |
| Validation set | 17.61% | 20.75% | 16.10% |

Figure 6:
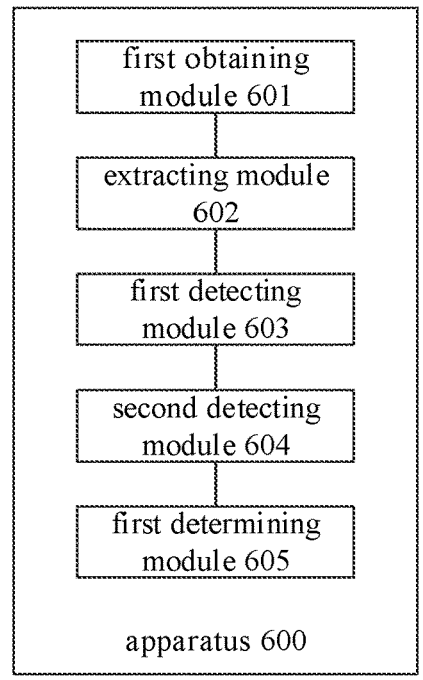
FIG. 6 is a block diagram of an apparatus for detecting an audio signal according to an embodiment of the present disclosure.

FIG. 6 is a block diagram of an apparatus for detecting an audio signal according to an embodiment of the present disclosure. As illustrated in FIG. 6, the apparatus 600 includes a first obtaining module 601, an extracting module 602, a first detecting module 603, a second detecting module 604 and a first determining module 605.

The first obtaining module 601 is configured to obtain a speech segment and a non-speech segment of an audio signal to be detected.

The extracting module 602 is configured to extract a first audio feature of the speech segment and a second audio feature of the non-speech segment.

The first detecting module 603 is configured to detect the first audio feature using a predetermined speech segment detection model to obtain a first detection score.

The second detecting module 604 is configured to detect the second audio feature using a predetermined non-speech segment detection model to obtain a second detection score.

The determining module is configured to determine whether the audio signal belongs to a target audio based on the first detection score and the second detection score.

In some embodiments, the first obtaining module includes a first recognizing sub-module, a second recognizing sub-module, a first determining sub-module, and a second determining sub-module.

The first recognizing sub-module is configured to recognize a first silent segment in the audio signal using a first recognition way.

The second recognizing sub-module is configured to recognize an unvoiced sound segment and a second silent segment in the audio signal using a second recognition way.

The first determining sub-module is configured to determine a union of the unvoiced sound segment, the first silent segment and the second silent segment as the non-speech segment.

The second determining sub-module is configured to determine an audio segment other than the non-speech segment in the audio signal as the speech segment.

In some embodiments, the first recognizing sub-module is configured to perform an energy detection on the audio signal with a voice activity detection (VAD), and determine an audio segment having energy less than a predetermined threshold in the audio signal as the first silent segment.

In some embodiments, the second recognizing sub-module is configured to generate a phoneme set of the audio signal through a hidden markov model (HMM), perform a phoneme alignment on the phoneme set with a montreal forced aligner (MFA), and obtain the unvoiced sound segment and the second silent segment in the phoneme set after the phoneme alignment.

In some embodiments, the predetermined speech segment detection model includes a first real sound model and a first attack sound model. The first detecting module includes a first detecting sub-module, a second detecting sub-module and a third determining sub-module.

The first detecting sub-module is configured to detect the first audio feature using the first real sound model to obtain a first real sound score.

The second detecting sub-module is configured to detect the first audio feature using the first attack sound model to obtain a first attack sound score.

The third determining sub-module is configured to determine the first detection score based on the first real sound score and the first attack sound score.

In some embodiments, the predetermined non-speech segment detection model includes a second real sound model and a second attack sound model. The second detecting module includes a third detecting sub-module, a fourth detecting sub-module and a fourth determining sub-module.

The third detecting sub-module is configured to detect the second audio feature using the second real sound model to obtain a second real sound score.

The fourth detecting sub-module is configured to detect the second audio feature using the second attack sound model to obtain a second attack sound score.

The fourth determining sub-module is configured to determine the second detection score based on the second real sound score and the second attack sound score.

In some embodiments, the extracting module includes a second obtaining module, a first extracting sub-module and a second extracting sub-module.

The second obtaining module is configured to obtain a number of collecting channels of the audio signal.

The first extracting sub-module is configured to extract the first audio feature of the speech segment with a cepstral mean and variance normalization (CMVN) if the number of collecting channels satisfies a predetermined number condition.

The second extracting sub-module is configured to extract the second audio feature of the non-speech segment with the CMCN if the number of collecting channels satisfies the predetermined number condition.

In some embodiments, the extracting module includes a fifth determining sub-module, a third extracting sub-module and a fourth extracting sub-module.

The fifth determining sub-module is configured to determine an extraction frequency band of the first audio feature based on a relevancy between the audio signal and a predetermined speech content.

The third extracting sub-module is configured to extract the first audio feature on the extraction frequency band from the speech segment.

The fourth extracting sub-module is configured to extract the second audio feature from the non-speech segment.

In some embodiments, the apparatus further includes a first training module, and a second training module.

The first training module is configured to perform a training based on speech data in predetermined audio data to obtain the speech segment detection model.

The second training module is configured to perform a training based on non-speech data in the predetermined audio data to obtain the non-speech segment detection model.

In some embodiments, the predetermined audio data includes predetermined real sound data and predetermined attack sound data. The speech segment detection model includes a first real sound model and a first attack sound model. The non-speech segment detection model includes a second real sound model and a second attack sound model.

The first training module is configured to perform the training based on the speech data in the predetermined real sound data to obtain the first real sound model, and perform the training based on the speech data in the predetermined attack sound data to obtain the first attack sound model.

The second training module is configured to perform the training based on the non-speech data in the predetermined real sound data to obtain the second real sound model, and perform the training based on the non-speech data in the predetermined attack sound data to obtain the second attack sound model.

Regarding the apparatus in the foregoing embodiment, the specific manner in which each module performs operations has been described in detail in the embodiments of the related method, and will not be elaborated here.

Figure 7:
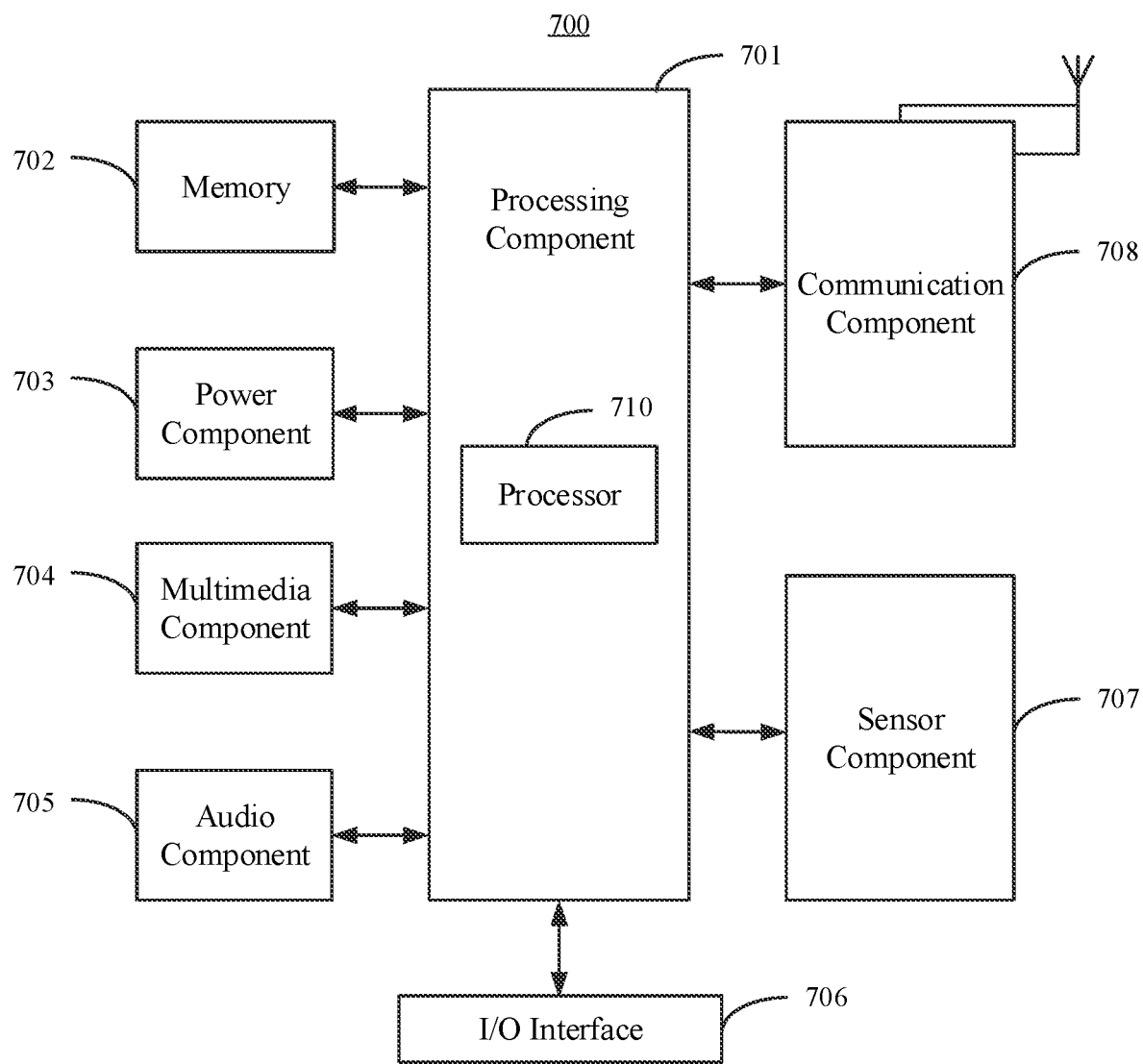
FIG. 7 is a block diagram of a device for detecting an audio signal according to an embodiment of the present disclosure.

FIG. 7 is a block diagram of a device 700 according to an embodiment of the present disclosure. For example, the device 700 may be a mobile phone, a computer, a digital broadcast terminal, a messaging device, a gaming console, a tablet, a medical device, exercise equipment, a personal digital assistant, and the like.

Referring to FIG. 7, the device 700 may include one or more of the following components: a processing component 702, a memory 702, a power component 703, a multimedia component 704, an audio component 705, an input/output (I/O) interface 706, a sensor component 707, and a communication component 708.

The processing component 701 typically controls overall operations of the device 700, such as the operations associated with display, telephone calls, data communications, camera operations, and recording operations. The processing component 701 may include one or more processors 710 to execute instructions to perform all or part of the steps in the above described methods. Moreover, the processing component 701 may include one or more modules which facilitate the interaction between the processing component 701 and other components. For instance, the processing component 701 may include a multimedia module to facilitate the interaction between the multimedia component 704 and the processing component 701.

The memory 702 is configured to store various types of data to support the operation of the device 700. Examples of such data include instructions for any applications or methods operated on the device 700, contact data, phonebook data, messages, pictures, video, etc. The memory 702 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 703 provides power to various components of the device 700. The power component 703 may include a power management system, one or more power sources, and any other components associated with the generation, management, and distribution of power in the device 700.

The multimedia component 704 includes a screen providing an output interface between the device 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 704 includes a front camera and/or a rear camera. The front camera and the rear camera may receive an external multimedia datum while the device 700 is in an operation mode, such as a photographing mode or a video mode. Each of the front camera and the rear camera may be a fixed optical lens system or have focus and optical zoom capability.

The audio component 705 is configured to output and/or input audio signals. For example, the audio component 705 includes a microphone ("MIC") configured to receive an external audio signal when the device 700 is in an operation mode, such as a call mode, a recording mode, and a voice recognition mode. The received audio signal may be further stored in the memory 702 or transmitted via the communication component 708. In some embodiments, the audio component 705 further includes a speaker to output audio signals.

The I/O interface 706 provides an interface between the processing component 701 and peripheral interface modules, such as a keyboard, a click wheel, buttons, and the like. The buttons may include, but are not limited to, a home button, a volume button, a starting button, and a locking button.

The sensor component 707 includes one or more sensors to provide status assessments of various aspects of the device 700. For instance, the sensor component 707 may detect an open/closed status of the device 700, relative positioning of components, e.g., the display and the keypad, of the device 700, a change in position of the device 700 or a component of the device 700, a presence or absence of user contact with the device 700, an orientation or an acceleration/deceleration of the device 700, and a change in temperature of the device 700. The sensor component 707 may include a proximity sensor configured to detect the presence of nearby objects without any physical contact. The sensor component 707 may also include a light sensor, such as a CMOS or CCD image sensor, for use in imaging applications. In some embodiments, the sensor component 707 may also include an accelerometer sensor, a gyroscope sensor, a magnetic sensor, a pressure sensor, or a temperature sensor.

The communication component 708 is configured to facilitate communication, wired or wirelessly, between the device 700 and other devices. The device 700 can access a wireless network based on a communication standard, such as Wi-Fi, 2G, or 3G, or a combination thereof. In one exemplary embodiment, the communication component 708 receives a broadcast signal or broadcast associated information from an external broadcast management system via a broadcast channel. In one exemplary embodiment, the communication component 708 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 702, executable by the processor 710 in the device 700, for performing the above-described methods. For example, the non-transitory computer-readable storage medium may be a ROM, a RAM, a CD-ROM, a magnetic tape, a floppy disc, an optical data storage device, and the like.

The embodiment of the present disclosure further provides a non-transitory computer readable storage medium having instructions stored therein, when the instructions are executed by a processor of a mobile terminal, the mobile terminal is caused to implement the method described in any above embodiment.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:
1. A method for detecting an audio signal, comprising:
obtaining a speech segment and a non-speech segment of an audio signal to be detected;

extracting a first audio feature of the speech segment and a second audio feature of the non-speech segment;

detecting the first audio feature using a predetermined speech segment detection model to obtain a first detection score;

detecting the second audio feature using a predetermined non-speech segment detection model to obtain a second detection score; and determining whether the audio signal belongs to a target audio based on the first detection score and the second detection score;

wherein the extracting the first audio feature of the speech segment comprises:

determining an extraction frequency band on which the first audio feature is extracted based on a relevancy between the audio signal and a predetermined speech content that is textual information existing in a lower frequency band; and extracting the first audio feature on the extraction frequency band from the speech segment;

wherein determining the extraction frequency band of the first audio feature based on the relevancy between the audio signal and the predetermined speech content comprises:

in response to the relevancy being less than a predetermined threshold, determining a predetermined first frequency band as the extraction frequency band;

in response to the relevancy being greater than or equal to the predetermined threshold, determining a predetermined second frequency band as the extraction frequency band, wherein the predetermined second frequency band has a bandwidth larger than that of the predetermined first frequency band and contains the predetermined first frequency band.

2. The method of claim 1, wherein the obtaining the speech segment and the non-speech segment of the audio signal to be detected comprises:

recognizing a first silent segment in the audio signal using a first recognition way;

recognizing an unvoiced sound segment and a second silent segment in the audio signal using a second recognition way;

determining a union of the unvoiced sound segment, the first silent segment and the second silent segment as the non-speech segment; and determining an audio segment other than the non-speech segment in the audio signal as the speech segment.

3. The method of claim 2, wherein the recognizing the first silent segment in the audio signal using the first recognition way comprises:

performing an energy detection on the audio signal with a voice activity detection (VAD); and determining an audio segment having energy less than a predetermined threshold in the audio signal as the first silent segment.

4. The method of claim 2, wherein the recognizing the unvoiced sound segment and the second silent segment in the audio signal using the second recognition way comprises:

generating a phoneme set of the audio signal through a hidden markov model (HMM);

performing a phoneme alignment on the phoneme set with a montreal forced aligner (MFA); and obtaining the unvoiced sound segment and the second silent segment in the phoneme set after the phoneme alignment.

5. The method of claim 1, wherein, the predetermined speech segment detection model includes a first real sound model and a first attack sound model, the detecting the first audio feature using the predetermined speech segment detection model to obtain the first detection score comprises:

detecting the first audio feature using the first real sound model to obtain a first real sound score;

detecting the first audio feature using the first attack sound model to obtain a first attack sound score; and determining the first detection score based on the first real sound score and the first attack sound score.

6. The method of claim 1, wherein, the predetermined non-speech segment detection model includes a second real sound model and a second attack sound model, the detecting the second audio feature using the predetermined non-speech segment detection model to obtain the second detection score comprises:

detecting the second audio feature using the second real sound model to obtain a second real sound score;

detecting the second audio feature using the second attack sound model to obtain a second attack sound score; and determining the second detection score based on the second real sound score and the second attack sound score.

7. The method of claim 1, wherein the extracting the first audio feature of the speech segment and the second audio feature of the non-speech segment comprises:

obtaining a number of collecting channels of the audio signal; and extracting the first audio feature of the speech segment and the second audio feature of the non-speech segment with a cepstral mean and variance normalization (CMVN) when the number of collecting channels satisfies a predetermined number condition.

8. The method of claim 1, further comprising:

performing a training based on speech data in predetermined audio data to obtain the speech segment detection model; and performing a training based on non-speech data in the predetermined audio data to obtain the non-speech segment detection model.

9. The method of claim 8, wherein, the predetermined audio data includes predetermined real sound data and predetermined attack sound data, the predetermined speech segment detection model includes a first real sound model and a first attack sound model, the predetermined non-speech segment detection model includes a second real sound model and a second attack sound model;

wherein performing the training based on the speech data in the predetermined audio data to obtain the speech segment detection model comprises:

performing the training based on the speech data in the predetermined real sound data to obtain the first real sound model; and performing the training based on the speech data in the predetermined attack sound data to obtain the first attack sound model;

wherein performing the training based on the non-speech data in the predetermined audio data to obtain the non-speech segment detection model comprises:

performing the training based on the non-speech data in the predetermined real sound data to obtain the second real sound model; and performing the training based on the non-speech data in the predetermined attack sound data to obtain the second attack sound model.

10. A device for detecting an audio signal, comprising:
a processor; and
a memory for storing executable instructions capable of running on the processor;
wherein when the processor is configured to execute the executable instructions, the executable instructions perform the following:
obtaining a speech segment and a non-speech segment of an audio signal to be detected;
extracting a first audio feature of the speech segment and a second audio feature of the non-speech segment;
detecting the first audio feature using a predetermined speech segment detection model to obtain a first detection score;
detecting the second audio feature using a predetermined non-speech segment detection model to obtain a second detection score; and
determining whether the audio signal belongs to a target audio based on the first detection score and the second detection score;
wherein the extracting the first audio feature of the speech segment comprises:
determining an extraction frequency band on which the first audio feature is extracted based on a relevancy between the audio signal and a predetermined speech content that is textual information existing in a lower frequency band; and
extracting the first audio feature on the extraction frequency band from the speech segment;
wherein determining the extraction frequency band of the first audio feature based on the relevancy between the audio signal and the predetermined speech content comprises:
in response to the relevancy being less than a predetermined threshold, determining a predetermined first frequency band as the extraction frequency band;
in response to the relevancy being greater than or equal to the predetermined threshold, determining a predetermined second frequency band as the extraction frequency band, wherein the predetermined second frequency band has a bandwidth larger than that of the predetermined first frequency band and contains the predetermined first frequency band.

11. The device of claim 10, wherein the obtaining the speech segment and the non-speech segment of the audio signal to be detected comprises:
recognizing a first silent segment in the audio signal using a first recognition way;
recognizing an unvoiced sound segment and a second silent segment in the audio signal using a second recognition way;
determining a union of the unvoiced sound segment, the first silent segment and the second silent segment as the non-speech segment; and
determining an audio segment other than the non-speech segment in the audio signal as the speech segment.

12. The device of claim 11, wherein the recognizing the first silent segment in the audio signal using the first recognition way comprises:
performing an energy detection on the audio signal with a voice activity detection (VAD); and
determining an audio segment having energy less than a predetermined threshold in the audio signal as the first silent segment.

13. The device of claim 11, wherein the recognizing the unvoiced sound segment and the second silent segment in the audio signal using the second recognition way comprises:
generating a phoneme set of the audio signal through a hidden markov model (HMM);
performing a phoneme alignment on the phoneme set with a montreal forced aligner (MFA); and
obtaining the unvoiced sound segment and the second silent segment in the phoneme set after the phoneme alignment.

14. The device of claim 10, wherein, the predetermined speech segment detection model includes a first real sound model and a first attack sound model, the detecting the first audio feature using the predetermined speech segment detection model to obtain the first detection score comprises:
detecting the first audio feature using the first real sound model to obtain a first real sound score;
detecting the first audio feature using the first attack sound model to obtain a first attack sound score; and
determining the first detection score based on the first real sound score and the first attack sound score.

15. The device of claim 10, wherein, the predetermined non-speech segment detection model includes a second real sound model and a second attack sound model, the detecting the second audio feature using the predetermined non-speech segment detection model to obtain the second detection score comprises:
detecting the second audio feature using the second real sound model to obtain a second real sound score;
detecting the second audio feature using the second attack sound model to obtain a second attack sound score; and
determining the second detection score based on the second real sound score and the second attack sound score.

16. The device of claim 10, wherein the extracting the first audio feature of the speech segment and the second audio feature of the non-speech segment comprises:
obtaining a number of collecting channels of the audio signal; and
extracting the first audio feature of the speech segment and the second audio feature of the non-speech segment with a cepstral mean and variance normalization (CMVN) when the number of collecting channels satisfies a predetermined number condition.

17. The device of claim 10, wherein the executable instructions further perform the following:
performing a training based on speech data in predetermined audio data to obtain the speech segment detection model; and
performing a training based on non-speech data in the predetermined audio data to obtain the non-speech segment detection model.

18. A non-transitory computer readable storage medium having computer executable instructions stored therein, wherein when the computer executable instructions are executed by a processor, the processor is caused to perform the following:
obtaining a speech segment and a non-speech segment of an audio signal to be detected;
extracting a first audio feature of the speech segment and a second audio feature of the non-speech segment;
detecting the first audio feature using a predetermined speech segment detection model to obtain a first detection score;

detecting the second audio feature using a predetermined non-speech segment detection model to obtain a second detection score; and determining whether the audio signal belongs to a target audio based on the first detection score and the second detection score;

wherein the extracting the first audio feature of the speech segment comprises:

determining an extraction frequency band on which the first audio feature is extracted based on a relevancy between the audio signal and a predetermined speech content that is textual information existing in a lower frequency band; and extracting the first audio feature on the extraction frequency band from the speech segment;

wherein determining the extraction frequency band of the first audio feature based on the relevancy between the audio signal and the predetermined speech content comprises:

in response to the relevancy being less than a predetermined threshold, determining a predetermined first frequency band as the extraction frequency band;

in response to the relevancy being greater than or equal to the predetermined threshold, determining a predetermined second frequency band as the extraction frequency band, wherein the predetermined second frequency band has a bandwidth larger than that of the predetermined first frequency band and contains the predetermined first frequency band.

\* \* \* \* \*